E. A. HILL.
Electric Battery.
No. 2,502. Reissued March 12, 1867.
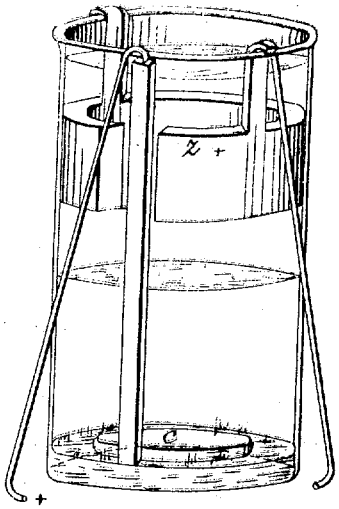
Witnesses.
Thos. A. E. Holcomb
Augustine J. Hibbard.
Inventor:
Edward A. Hill.

United States Patent Office.

EDWARD A. HILL, OF CHICAGO, ILLINOIS.

*Letters Patent No.* 39,511, *dated August* 18, 1863; *antedated April* 9, 1862; *reissue No.* 2,502, *dated March* 12, 1867.

IMPROVEMENT IN GALVANIC BATTERIES.

The Schedule referred to in these Letters Patent and making part of the same.

TO ALL WHOM IT MAY CONCERN:

Be it known that I, EDWARD A. HILL, of Chicago, in the county of Cook, and State of Illinois, (formerly of Galesburg, in said State,) have invented a new and useful Improvement in Galvanic Batteries; and I do hereby declare and make known that the following is a full, clear, and exact description thereof, reference being had to the accompanying drawings, and the letters and figures marked thereon, which form part of this specification.

The object of my invention is, in the construction of galvanic batteries, to dispense with the porous cup or partition ordinarily used to separate the two fluids in the battery, thereby securing a greater activity and power in the galvanic current or condition of the elements, and preventing, to a great extent, the precipitation of the positive metal upon the negative metal, and the coating of the latter by the former, the peculiar local position of the two metals being, at the same time, most suitable to, and such as to produce the best results.

To enable those skilled in the art to understand how to construct and use my invention, I will proceed to describe the construction and operation of the same with particularity, making reference in so doing to the aforesaid drawings, in which a perspective view of my invention is represented.

My invention consists in arranging the negative metal at or near the bottom of the battery cup, and the positive metal near the top of the battery cup, or above the negative metal, being suspended in any suitable manner, as shown.

To avoid prolixity, I will, in my description of my invention, instance as the elements to be used those which are usually employed in the Daniels battery, to wit, zinc and its sulphate in solution as the positive elements, and copper and its sulphate in crystals and solution as the negative elements, though any other suitable correlative elements may be used in the same manner. I take a vessel of such form that there may be a considerable depth of fluids contained therein, more or less, according to the size and form of the metallic plates used, and place upon the bottom of said containing vessel a copper plate or disk, marked C, having a protected conductor or pole attached thereto, and running upward and out of the vessel, as shown, said pole being indicated by the character +. When a strong battery is not desired, or when a series of cups are used in forming the battery, the said copper plate may consist simply of a narrow strip of copper, extending down to the bottom of the vessel, in which case that part of the strip passing through the upper part of the solution or fluid contained in the vessel must be protected from corrosion; or, an incorrosible metal, as lead, may be used for that part of the pole +. The zinc plate or block, marked *z* in the drawings, is then suspended in the vessel, as shown, by means of the hooks, or in any other suitable manner, the main point being to locate and maintain the zinc at a suitable distance above the copper plate in the bottom. There may be a central opening through the zinc plate for convenience in dropping the sulphate of copper crystals down upon the copper plate C, as hereinafter described. Attached to said zinc plate *z* is a conductor or pole, marked —. in the drawings; or, as before, where a series of cups are to be used, one end of the strip is soldered directly to the zinc in one vessel, being protected, or of incorrosible metal, as aforesaid; and the other end of said strip extends down to the bottom of the contiguous or adjacent cup in the battery, the first zinc and last copper in the series being of course excepted.

Having described the construction or arrangement of my improved battery, I will now proceed to describe the manner in which the same is used and operated. The battery being prepared as aforesaid, I then fill the cup nearly full of a strong but not saturated solution of sulphate of zinc, so that the solution will rise just above the zinc and immerse it. I then drop into the solution, through the aforesaid opening in the zinc block or plate, gently but quickly, so as not to stir or agitate the solution, a quantity of the crystals of sulphate of copper, which sink to the bottom upon the copper plate and dissolve; and the solution at that point becomes the negative exciting fluid. Care must be taken never to stir or agitate this solution, so as to cause it to rise to the top and come in contact with the zinc plate, the greater specific gravity tending to keep this fluid at the bottom, if not disturbed. Thus by arranging the copper metal, or its equivalent, in the bottom, and the zinc, or its equivalent, above the copper in the battery cup, each plate of the battery may have its appropriate pabulum surrounding and in contact with it, without the intervention of a porous cup or partition, insuring, at the same time, a more active and powerful galvanic condition.

The chemical action manifested in the operation of the battery I suppose to be as follows: The poles being connected, the oxygen of the water combines with the zinc, forming the oxide of zinc, with which the sulphuric acid in the sulphate of copper combines, forming sulphate of zinc in solution. Simultaneously the hydrogen, freed from its oxygen, unites with the oxygen of the oxide of copper, forming water. The metallic copper thus evolved is deposited upon the negative plate. As long as any crystals of the sulphate of copper remain undissolved in the bottom of the vessel, the water thus formed goes to dissolve them; but when no more remain, it goes to dilute the solution. It is, therefore, necessary to add, from time to time, fresh crystals of the sulphate of copper, to prevent the newly-formed water from diluting the solution; and, also, the solution of sulphate of zinc, as it becomes nearly saturated, must, from time to time, be drawn off from the top and replaced with fresh water.

Having described the construction and mode of operating my said improvement, I will now specify what I claim, and desire to secure by Letters Patent.

I claim the combination and arrangement of the battery cup, and the positive and negative electrodes, as and for the purposes specified.

E. A. HILL.

Witnesses:
W. E. MARRS,
L. L. COBURN.